US010782856B2

(12) United States Patent
Qian et al.

(10) Patent No.: US 10,782,856 B2
(45) Date of Patent: Sep. 22, 2020

(54) METHOD AND DEVICE FOR DISPLAYING APPLICATION FUNCTION INFORMATION, AND TERMINAL DEVICE

(71) Applicant: BAIDU ONLINE NETWORK TECHNOLOGY (BEIJING) CO., LTD., Beijing (CN)

(72) Inventors: Lu Qian, Beijing (CN); Xufei Jiang, Beijing (CN); Xiangnan Yuan, Beijing (CN); Guanghao Shen, Beijing (CN); Xing Luo, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/173,909

(22) Filed: Oct. 29, 2018

(65) Prior Publication Data
US 2019/0294306 A1 Sep. 26, 2019

(30) Foreign Application Priority Data

Mar. 26, 2018 (CN) .......................... 2018 1 0252794

(51) Int. Cl.
G06F 3/16 (2006.01)
G06F 3/0483 (2013.01)
G06F 3/01 (2006.01)
G06F 3/00 (2006.01)

(52) U.S. Cl.
CPC ............ *G06F 3/0483* (2013.01); *G06F 3/017* (2013.01); *G06F 3/167* (2013.01); *G06F 2203/04803* (2013.01)

(58) Field of Classification Search
CPC ......... G06F 3/0483; G06F 3/017; G06F 3/167
See application file for complete search history.

(56) References Cited

U.S. PATENT DOCUMENTS 6,005,549 A * 12/1999 Forest .................... G06F 3/011
345/157
6,985,865 B1 * 1/2006 Packingham ........... G10L 15/22
704/275
7,136,817 B2 * 11/2006 Schroder ................. G10L 15/26
704/275

(Continued)

FOREIGN PATENT DOCUMENTS

EP 3333675 A1 * 6/2018 ........... G06F 3/0483
JP H1074383 A 3/1998

(Continued)

OTHER PUBLICATIONS

Japanese Patent Application No. 2018-177824, Office Action dated Dec. 3, 2019, 6 pages.

(Continued)

Primary Examiner — Nicholas Augustine
(74) Attorney, Agent, or Firm — Lathrop GPM LLP

(57) ABSTRACT

Embodiments of the present disclosure provide a method and a device for training an acoustic model, a terminal device and a storage medium. The method includes: displaying a content card associated with an application function on a screen of a terminal device; and performing a switching operation on the content card currently displayed on the screen when detecting that a preset switching condition is satisfied.

16 Claims, 11 Drawing Sheets

(56) References Cited

U.S. PATENT DOCUMENTS

| | | | |
|---|---|---|---|
| 7,251,604 B1* | 7/2007 | Thenthiruperai | G10L 15/22 704/270.1 |
| 8,239,207 B2* | 8/2012 | Seligman | G06F 40/58 704/277 |
| 8,453,058 B1* | 5/2013 | Coccaro | G06F 3/0482 715/727 |
| 8,635,073 B2* | 1/2014 | Chang | H04N 21/41407 704/275 |
| 8,712,778 B1* | 4/2014 | Thenthiruperai | G10L 15/22 704/270.1 |
| 2006/0149558 A1* | 7/2006 | Kahn | G10L 15/18 704/278 |
| 2007/0061149 A1* | 3/2007 | Chang | H04N 21/4828 704/275 |
| 2009/0204386 A1* | 8/2009 | Seligman | G06F 40/268 704/2 |
| 2009/0217324 A1* | 8/2009 | Massimi | H04N 21/25891 725/46 |
| 2012/0215640 A1* | 8/2012 | Ramer | G06Q 30/0269 705/14.55 |
| 2017/0011210 A1* | 1/2017 | Cheong | G06F 3/017 |

FOREIGN PATENT DOCUMENTS

| | | |
|---|---|---|
| JP | 2007150662 A | 6/2007 |
| JP | 2015158748 A | 9/2015 |
| JP | 2017528776 A | 9/2017 |
| WO | WO 2007037264 A1 | 4/2007 |

OTHER PUBLICATIONS

Japanese Patent Application No. 2018-177824, English translation of Office Action dated Dec. 3, 2019, 6 pages.

* cited by examiner

METHOD AND DEVICE FOR DISPLAYING APPLICATION FUNCTION INFORMATION, AND TERMINAL DEVICE

CROSS REFERENCE TO RELATED APPLICATION

This application is based on and claims priority to Chinese Patent Application No. 201810252794.9, filed with the State Intellectual Property Office of P. R. China on Mar. 26, 2018, the entire contents of which are incorporated herein by reference.

FIELD

The present disclosure relates to the technical field of intelligent terminals, and more particularly to a method and a device for displaying application function information, and a terminal device.

BACKGROUND

The terminal device in the related art usually accesses the function page in a multi-level menu interaction manner or by clicking an icon, when the user wants to use a certain function of an application in the terminal device, the user needs to find the icon of the application in the display interface of the terminal device to enter the application, and then find the desired function from the application.

In the related art, the screen of the terminal device merely functions as a channel for information output. Functions commonly used by the user are typically hidden in the lower layer of the multi-level menu. As a result, user needs to perform multiple operations to use the desired function. Such an operation process is cumbersome, not user-friendly, and the efficiency of usage is very low.

SUMMARY

Embodiments of the present disclosure provide a method for displaying application function information. The method includes: displaying a content card associated with an application function on a screen of a terminal device; and performing a switching operation on the content card currently displayed on the screen when detecting that a preset switching condition is satisfied.

Embodiments of the present disclosure provide a terminal device. The terminal device includes a display screen, a processor and a memory. The display screen is configured to display a content card associated with an application function. The processor is configured to run a program corresponding to executable program codes by reading the executable program codes stored in the memory, to implement the method for displaying application function information according to embodiments of the present disclosure.

Embodiments of the present disclosure provide a computer program product. When instructions stored in the computer program product are executed by a processor, the method for displaying application function information according to embodiments of the present disclosure is implemented.

Embodiments of the present disclosure provide a non-transitory computer-readable storage medium having computer programs stored thereon. When the programs are executed by a processor, the method for displaying application function information according to embodiments of the present disclosure is implemented.

Additional aspects and advantages of embodiments of present disclosure will be given in part in the following descriptions, become apparent in part from the following descriptions, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which:

FIG. 4 (b) is a schematic diagram illustrating mix of horizontal and longitudinal arrangements of content cards;

DETAILED DESCRIPTION

Figure 1A:
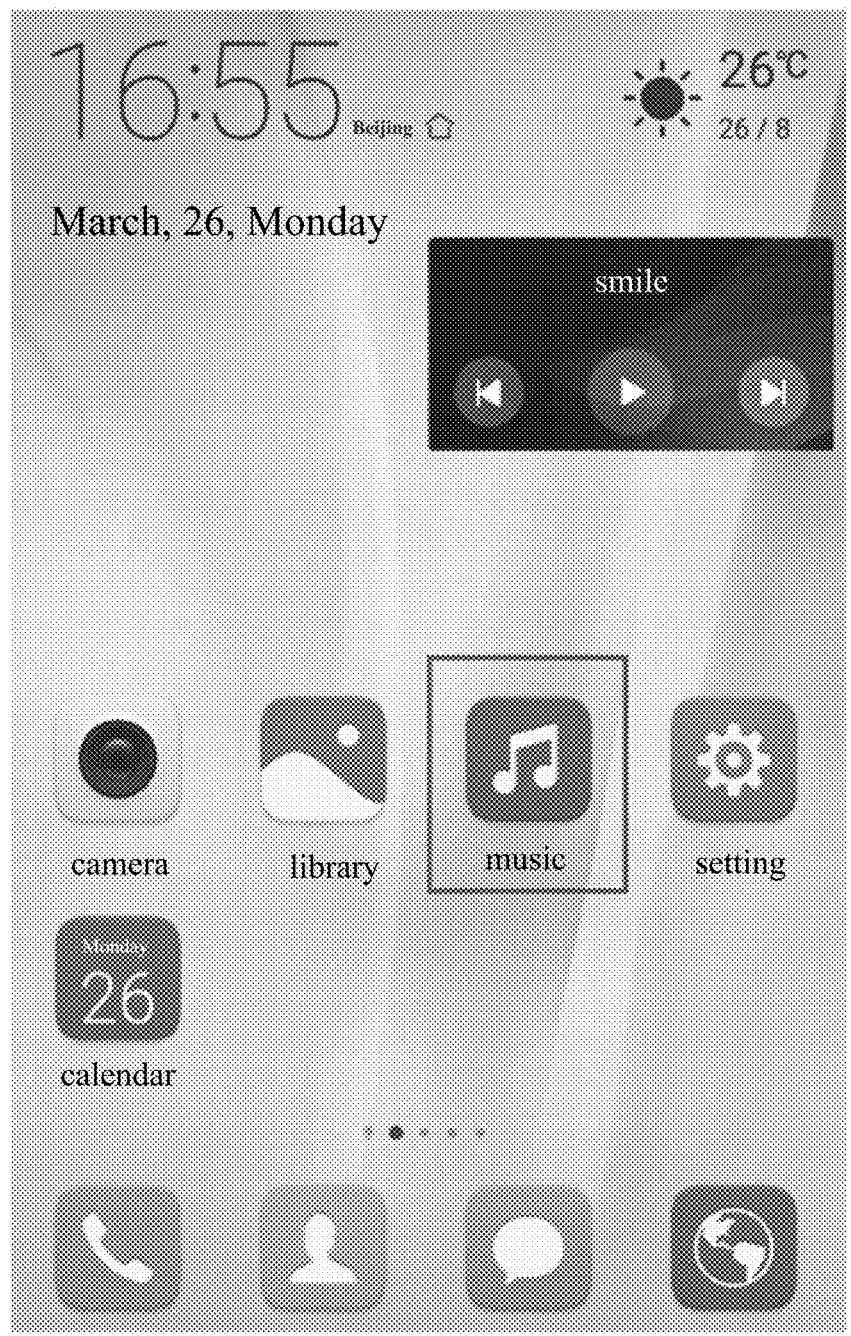
FIG. 1(a) is a schematic diagram one of a process of listening to a radio program of a music application in the related art.

Embodiments of the present disclosure will be described in detail and examples of certain embodiments are illustrated in the drawings. The same or similar elements and the elements having the same or similar functions are denoted by like reference numerals throughout the descriptions.

Embodiments described herein with reference to drawings are explanatory, serving to explain the present disclosure, and are not construed to limit embodiments of the present disclosure.

The method and the device for displaying application function information according to embodiments of the present disclosure will be described below with reference to the accompanying drawings.

Figure 1B:
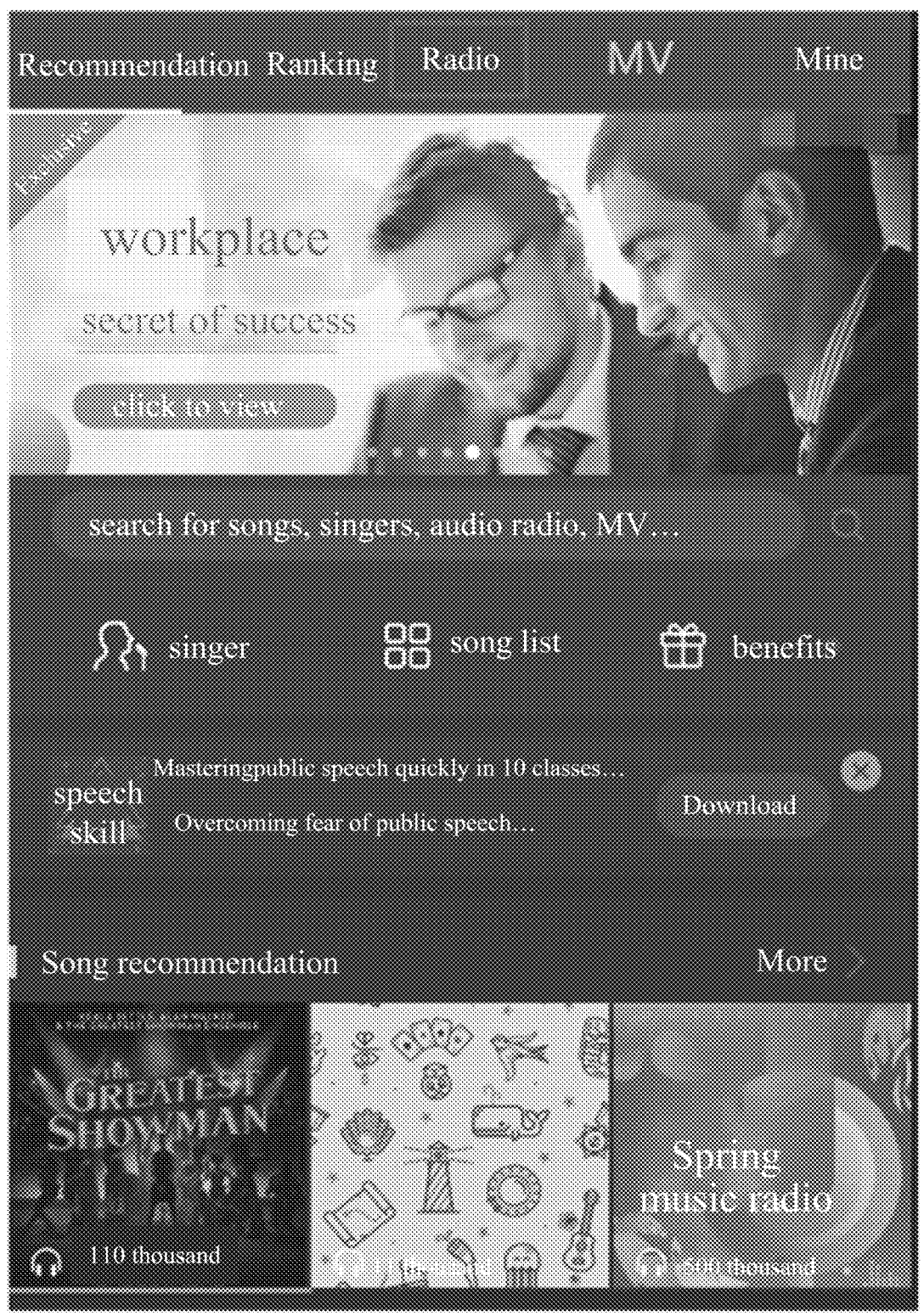
FIG. 1(b) is a schematic diagram two of a process of listening to a radio program of a music application in the related art.
Figure 1C:
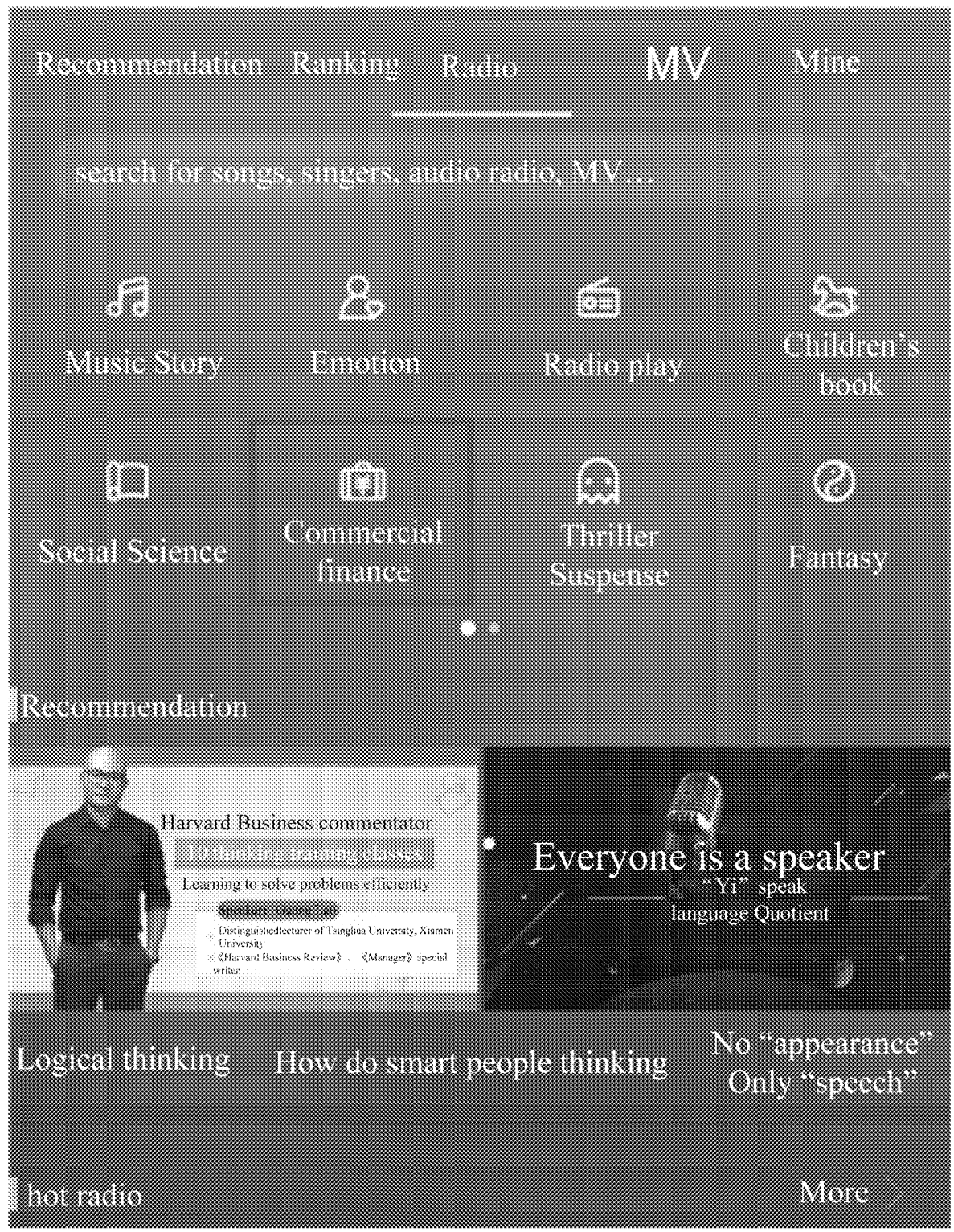
FIG. 1(c) is a schematic diagram three of a process of listening to a radio program of a music application in the related art.

In the related art, many functions of the application are hidden in the lower layer of the multi-level menu, and the user needs to perform multiple operations to find the desired function. For example, the user wants to listen to a radio program of a music application, as illustrated in FIG. 1(a), FIG. 1(b) and FIG. 1(c), the user needs to find the icon of the music application from the screen of the smart phone, as illustrated in FIG. 1 (a); and then the user needs to click the icon to enter the application, in this case, a "recommended" interface of the application is displayed, as illustrated in FIG. 1 (b); when the user wants to listen to the radio program, the user needs to select "radio" in the interface illustrated in FIG. 1(b), and then the radio interface illustrated in FIG. 1(c) can be entered, and the user can find or search for the desired radio program in this interface. For example, when the user wants to listen to a financial program, the user can select "commercial finance" in the interface as illustrated in FIG. 1(c). It can be seen that, in the related art, when the user wants to listen to the radio program in the music application, at least three operations need to be performed.

Regarding the technical problems in the related art that the user needs to perform multiple operations to find the desired function, usage convenience is poor and efficiency is low, embodiments of the present disclosure provide a method for displaying application function information, which can directly display the application function on the screen of the terminal device, the user can directly find the desired function, such that user's operation steps can be reduced, and search efficiency can be improved.

Figure 2:
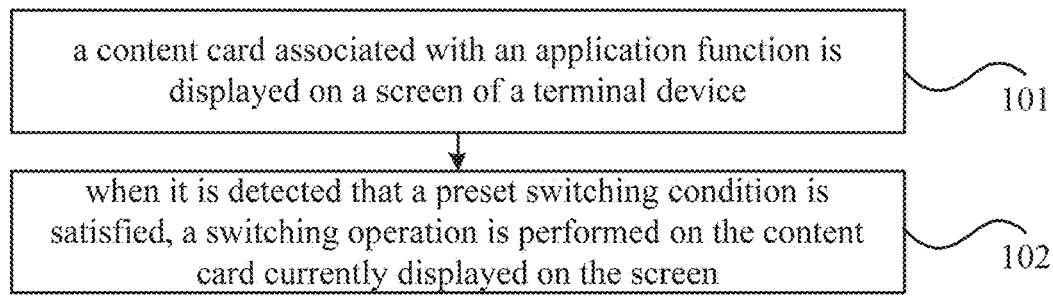
FIG. 2 is a flow chart of a method for displaying application function information according to an embodiment of the present disclosure.

FIG. 2 is a flow chart of a method for displaying application function information according to an embodiment of the present disclosure.

As illustrated in FIG. 2, the method may include the following.

At block 101, a content card associated with an application function is displayed on a screen of a terminal device.

The terminal device may be, for example, a device having a display screen such as a smart phone, a speaker, a refrigerator, a tablet computer, an electronic photo album, and the like. The application function may be, for example, a music function, a video playback function, a push function, a contact function, a weather function, and the like.

In the embodiment, for each application, a content card may be set for each function of the application, and the card for displaying functions can be displayed on the screen of the terminal device to facilitate user selection. Alternatively, the content card may be set only for functions commonly used by the user, and the card can be displayed on the screen of the terminal device, embodiments of the present disclosure do not limit it.

In detail, when the content card is displayed on the screen of the terminal device, preset display parameters can be obtained. The preset display parameters may include, but are not limited to, number of cards displayed on the screen and a display size of the content card. The display size refers to a ratio of the content card displayed to the screen of the terminal device, for example, the display size may be 80%, 90%, 100% (i.e., full screen display), etc. Further, the content card associated with the application function can be displayed on the screen of the terminal device according to the display parameters.

Figure 3A:
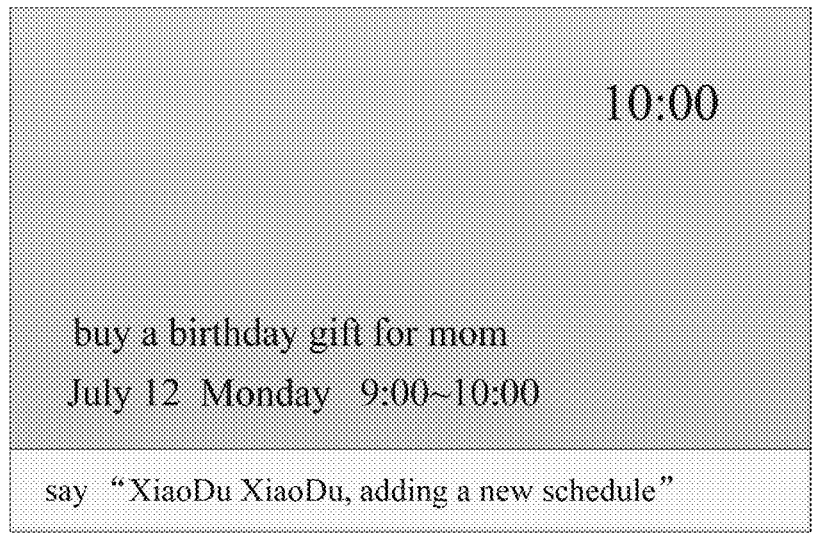
FIG. 3(a) is a schematic diagram of a content card displaying a schedule on a screen.
Figure 3B:
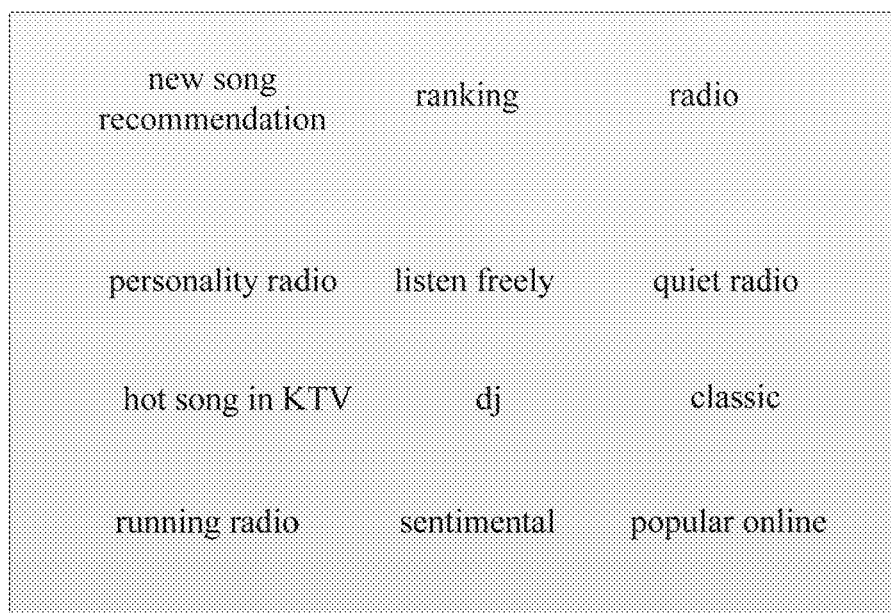
FIG. 3(b) is a schematic diagram of a radio of a music application displaying on a screen.
Figure 3C:
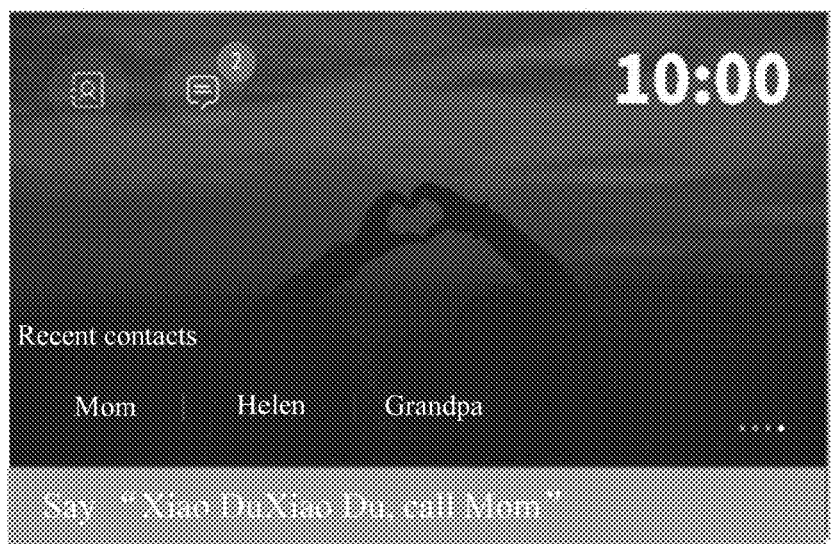
FIG. 3(c) is a schematic diagram of a content card displaying contacts on a screen.

As an example, the display size is full screen display, and only one content card is displayed on the screen each time, as illustrated in FIG. 3(a), the user can directly know the schedule "buy a birthday gift for mom" from the screen without entering the terminal device to find the application recording the schedule to view it. For another example, as illustrated in FIG. 3(b), the screen can directly display the display interface of the popular radio of the music application, and information such as radio, new song recommendation, and ranking can be displayed on the screen. For another example, as illustrated in FIG. 3(c), the screen the directly display the person that the user contacted recently, when the user needs to call the person contacted recently, the user can directly click the name of the person contacted recently instead of entering an address book to find the name, thus user's operation steps can be saved, and efficiency of function utilization can be improved.

Furthermore, in order to display more functions for the user, in a possible implementation of embodiments of the present disclosure, more than one card may be displayed on the screen, in this case, the display parameters may further include a card arrangement manner. The card arrangement manner may include any one of, for example, horizontal arrangement, longitudinal arrangement, mix of horizontal and longitudinal arrangements, and circular arrangement.

Figure 4A:
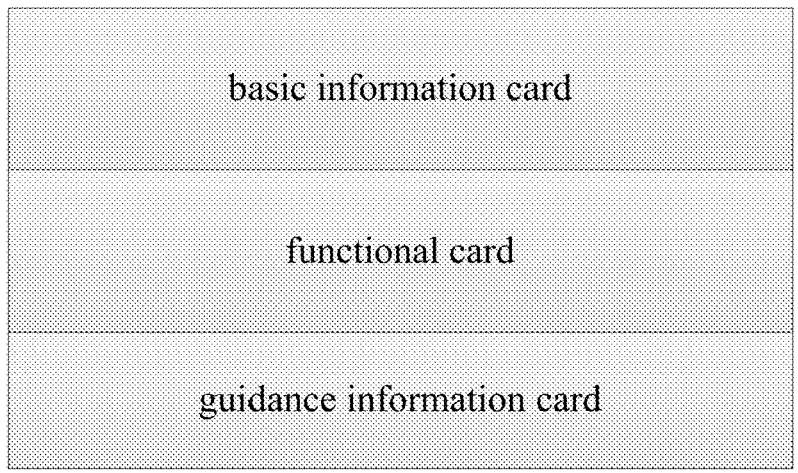
FIG. 4 (a) is a schematic diagram illustrating longitudinal arrangement of content cards.
Figure 4B:
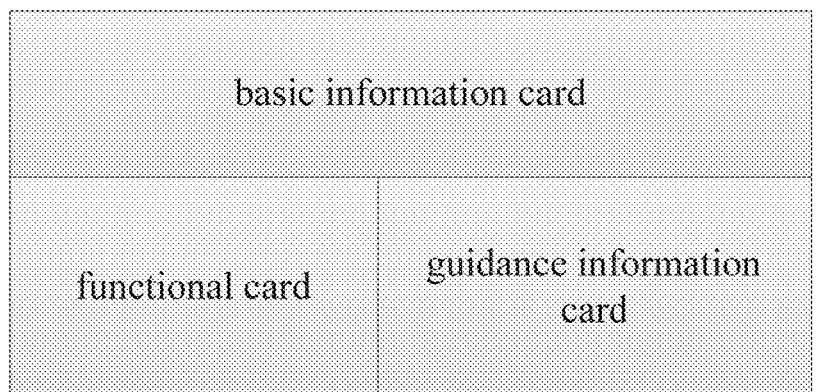

For example, when the content card displayed on the screen includes a basic information card, a functional card and a guidance information card, the three cards may be longitudinally arranged in order from top to bottom, as shown in FIG. 4(a), and the three cards may also be displayed in mix of horizontal and longitudinal arrangements, as shown in FIG. 4(b).

At block 102, when it is detected that a preset switching condition is satisfied, a switching operation is performed on the content card currently displayed on the screen.

In the embodiment, for the content card displayed on the screen, when it is detected that the preset switching condition is satisfied, the switching operation can be performed on the content card currently displayed on the screen. For example, when the content card currently displayed does not display the function that the user wants to use, the user can switch the content card manually or through speech control, when the terminal device receives the user's manual switching operation or receives user's speech switching instruction, the content card currently displayed can be switched.

As a possible implementation, the terminal device can receive a speech message from the user, and perform semantic recognition on the speech message. When it is recognized that the speech message matches a preset speech switching instruction, the switching operation can be performed on the content card currently displayed on the screen. The terminal device may recognize the received speech message by speech recognition technology, to obtain the content included in the speech message.

As an example, when the speech message sent by the user is the speech instruction indicating the terminal device to perform page flipping such as "Next page", "Next", "Next one", the terminal device can know that the user may want to view the next content card by recognizing the speech message, the terminal device can switch the content card displayed on the screen to the next content card.

As an example, the speech message sent by the user is "viewing the schedule", and then after the received speech message is recognized, the terminal device can switch the content card displayed on the screen to the card matching the schedule of the user.

As a possible implementation, the terminal device can detect a trigger operation of the user on the screen, when it is detected that the trigger operation matches a preset switching trigger operation, the switching operation can be performed on the content card currently displayed on the screen. For example, the preset switching trigger operation in the terminal device may include sliding leftwards to switch to the next content card and sliding rightwards to switch to the previous content. Then, when the user performs the sliding leftwards operation on the screen of the terminal device, the terminal device can switch the content card currently displayed on the screen to the next content card, and when the user performs the sliding rightwards operation on the screen of the terminal device, the terminal device can switch the content card currently displayed on the screen to the previous content card.

As a possible implementation, the terminal device may detect a limb movement trace of the user, when it is detected that the limb movement trace matches a preset switching trigger trace, the switching operation can be performed on the content card currently displayed on the screen.

At present, the terminal device is usually equipped with a camera, and the video of the user can be captured using the camera. Therefore, in the embodiment, the terminal device can analyze the video captured by the camera, and extract the limb movement trace of the user from the video, and then determine whether the content card currently displayed on the screen needs to be switched according to the limb movement trace. For example, when the terminal device detects from the video that the user nods two times continuously, the terminal device can switch the content card currently displayed on the screen to the next content card. Alternatively, a corresponding switching trigger trace may be set for each content card, when the terminal device detects the limb movement trace of the user from the video, the terminal device can match the detected limb movement trace with the preset switching trigger trace, and then the terminal device can switch the content card currently displayed on the screen to the content card corresponding to the matched switching trigger trace according to the matching result.

As a possible implementation, the terminal device may further detect whether a preset switching time has elapsed. When it is detects that the preset switching time period has elapsed, the content card currently displayed on the screen can be switched. In the embodiment, the content card displayed on the screen can be set to switch automatically. For example, the preset switching time may be 5 seconds, and the content card displayed on the screen can be automatically switched every 5 seconds.

Furthermore, when the terminal device switches the content card currently displayed on the screen, the terminal device can perform horizontally to left or right switching on the content card currently displayed on the screen to display other content cards associated with the application function, or the terminal device can perform longitudinally to up or down switching on the content card currently displayed on the screen to display other content cards associated with the application function, or terminal device can perform page flipping switching on the content card currently displayed on the screen to display other content cards associated with the application function. In detail, when the content card displayed on the screen is switched by page flipping, a page up button and a page down button can be set on the screen, and the user can switch the content card displayed by clicking and triggering the corresponding button.

With the method for displaying application function information according to embodiments of the present disclosure, the content card associated with the application function is displayed on the screen of the terminal device, when it is detected that the preset switching condition is satisfied, the content card currently displayed on the screen is switched. Thus, by displaying functions of the application on the screen of the terminal device, the functions of the application can be directly presented to the user, the inconvenience caused by displaying application functions in the multi-level menu manner in the related art can be avoided, such that the user can obtain the desired function without performing multiple operations, usage convenience and search efficiency can be improved, user experience can be improved, and technical problems that the user needs to perform multiple operation obtain the desired function in the related art can be solved.

Figure 5:
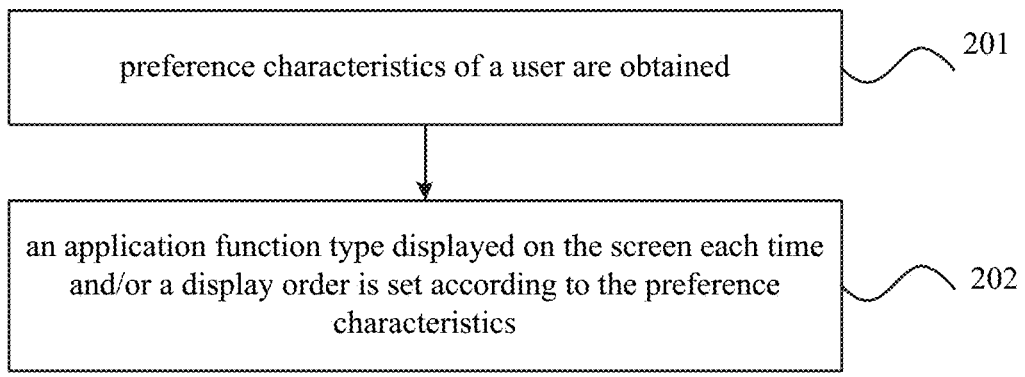
FIG. 5 is a flow chart of a method for displaying application function information according to another embodiment of the present disclosure.

In an embodiment, the content of the card displayed on the screen of the terminal device may not only be the function commonly used by the user, but also be the content of interest to the user. Therefore, embodiments of the present disclosure further provide a method for displaying application function information. FIG. 5 is a flow chart of a method for displaying application function information according to another embodiment of the present disclosure.

As illustrated in FIG. 5, on the basis of embodiments illustrated in FIG. 2, before block 101, the following may be included.

At block 201, preference characteristics of a user are obtained.

In detail, the preference characteristics of the user may be obtained based on application subscription content of the user. In the related art, some applications may provide a subscription function, such as the browser, the user can select content of interest (such as news, cars, constellations, etc.) in the browser, and the browser can recommend corresponding articles to the user according to the user's selection. Thus, in the embodiment, the preference characteristics of the user can be obtained based on the content subscribed by the user in the application.

Alternatively, the preference characteristics of the user may also be obtained based on browsing operation of the user on the content card. In the process of the user using the terminal device, the terminal device can record information or functions frequently browsed by the user, and then obtain the preference characteristics of the user based on the browsing operation of the user. For example, the user may often use the terminal device to listen to music, and view weather, life service and other information, the terminal device may know that the user's preference is music, weather, and notification information.

At block 202, an application function type displayed on the screen each time and/or a display order is set according to the preference characteristics.

In the embodiment, after the terminal device obtains the preference characteristics of the user, the terminal device can set the application function type displayed on the screen each time and/or the display order according to the preference characteristics.

The application function type may include, but is not limited to, one or more combinations of application usage guidance, application content notification, to-do lists reminder, instant messaging, hotspot recommendation and preference characteristic recommendation.

For example, as shown in Table 1, the application function type and the display order on each screen may be as follows.

TABLE 1

| application function type and display order | card content source | content card display information/display form |
| --- | --- | --- |
| (first screen) default information | application usage guidance/weather/time | text, digit, and/or icons |
| (second screen) application content notification | service notification, application notification, such as payment information, weather information | highlight (such as bold), text |
| (third screen) to-do lists reminder | Outlook | Outlook title, time, etc., text display |
| (fourth screen) contact | terminal matched contact | contact name, head portrait, default display number |
| (fifth screen) hotspot recommendation | suitable classification | image, text and/or time of occurrence |
| (sixth screen) event reminder | memo, calendar | event, time |

With the method for displaying application function information according to embodiments of the present disclosure, the preference characteristics of the user are obtained, and the application function type displayed on the screen each time and/or the display order can be set according to the preference characteristics, personalized display of the content card can be realized, such that the information displayed on the screen conforms to user's preference, flexibility and personalization can be improved, configurability of the content displayed on the screen can be improved, and user experience can be improved.

Figure 6:
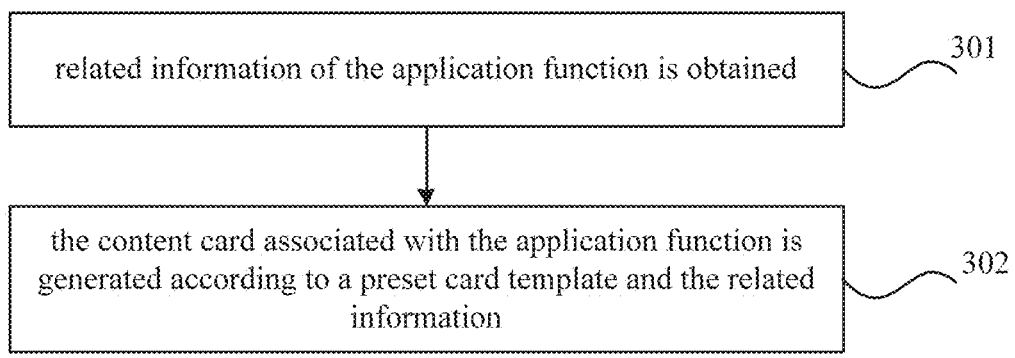
FIG. 6 is a flow chart of a method for displaying application function information according to yet another embodiment of the present disclosure.

In embodiments of the present disclosure, in order to display the content card on the screen of the terminal device, the content card needs to be generated first. In a possible implementation of embodiments of the present disclosure, the content card may be generated according to the function of the application installed in the terminal device, to display the content card on the screen. Therefore, embodiments of the present disclosure further provide a method for displaying application function information. FIG. 6 is a flow chart of a method for displaying application function information according to yet another embodiment of the present disclosure.

As illustrated in FIG. 6, on the basis of embodiments illustrated in FIG. 2, before block 101, the following may be included.

At block 301, related information of the application function is obtained.

In detail, the terminal device can obtain the related information of the application function from a local application of the terminal device. The local application refers to the application downloaded and installed by the user. The terminal device can also obtain the related information of the application function from an operating system application of the terminal device. The operating system application refers to the application built in the system of the terminal device, which does not need the user to download and install. The operating system application may be clock, weather, calendar, address book and other system applications. The terminal device can also obtain the related information of the application function from a network side.

At block 302, the content card associated with the application function is generated according to a preset card template and the related information.

The card template may include, but is not limited to, one or more combinations of a picture area, a text area, a summary area, a voice guidance area, a detailed content entry area, an application icon area, and a content subject list area.

In the embodiment, after the terminal device obtains the related information of the application function, the terminal device can generate the content card associated with the application function according to the preset card template and the related information.

For example, for the related information of the memo obtained by the terminal device, the text area and the detailed content entry area may be selected as the template for generating the content card. The detailed content of the reminder item established in the memo can be displayed in the detailed content entry area, and the time of the reminder item can be displayed in the text area, the content card displaying the reminder item can be obtained.

As another example, after the terminal device obtains the related information about the contact function, the picture area, the text area and the voice guidance area can be obtained as a template, the address book of the terminal device can be displayed in the picture area in an icon form, the three contacts that the user recently contacted can be displayed in the text area, and the prompt message can be displayed in the voice guidance area, the content card displaying the contact information can be obtained.

With the method for displaying application function information according to embodiments of the present disclosure, the related information of the application function is obtained, and the content card associated with the application function is generated according to the preset card template and the related information, the function of the application can be displayed on the screen, it is convenient for the user to use the function of the application, and the user does not need to perform multiple operations to enter the application to obtain the desired function, user's operation steps can be simplified, and efficiency of obtaining functions can be improved.

Furthermore, in a possible implementation of embodiments of the present disclosure, the terminal device may further receive speech message from the user, and perform semantic recognition on the speech message, and perform an operation processing on a corresponding area in the content card according to the semantic recognition result.

Figure 7:
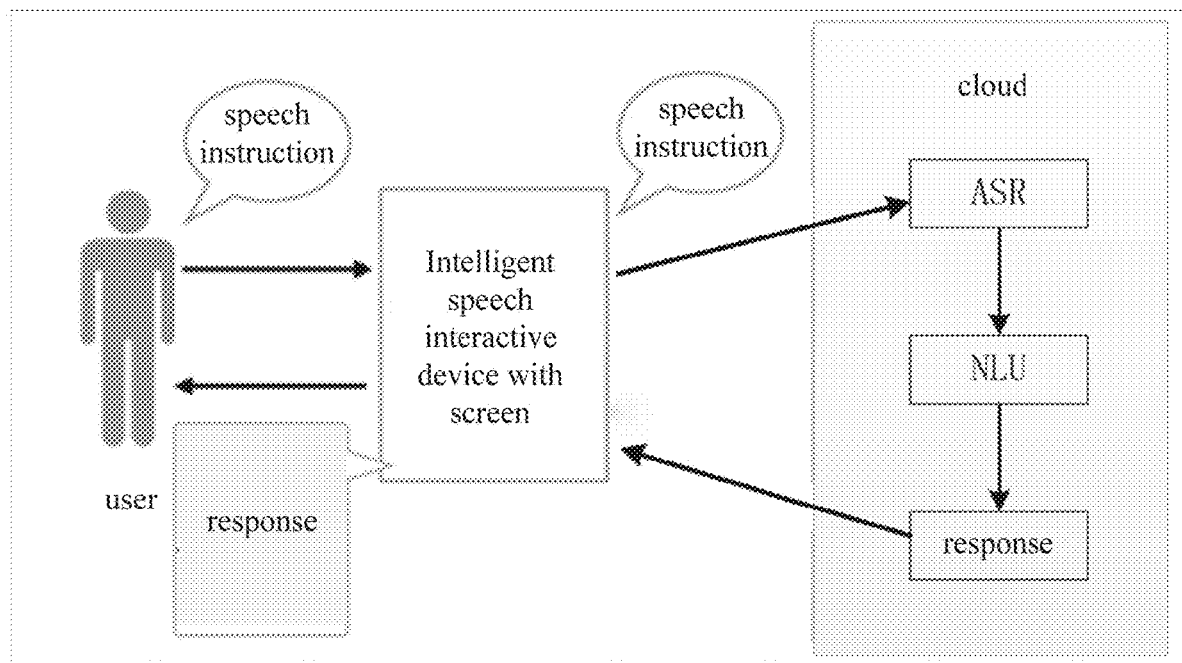
FIG. 7 is a schematic diagram of a user performing speech interaction with a terminal device.
Figure 8:
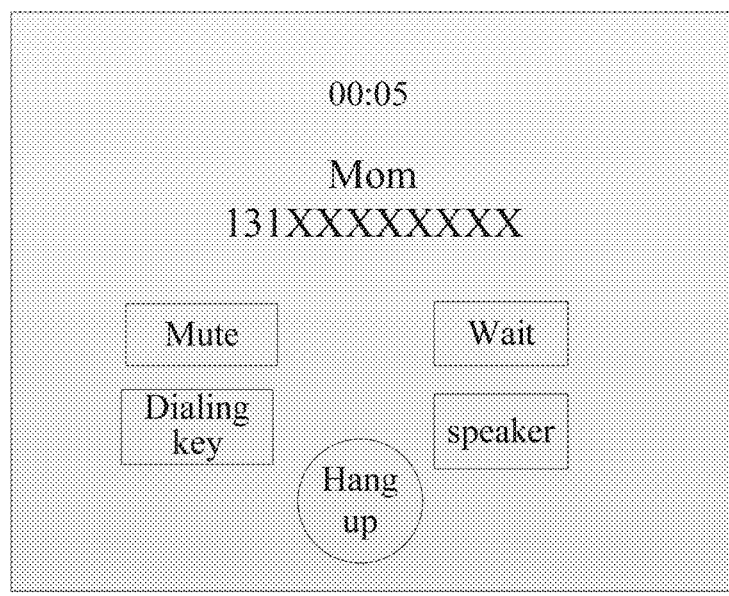
FIG. 8 is a schematic diagram of a screen of a terminal device displaying a dialing interface.

FIG. 7 is a schematic diagram of a user performing speech interaction with a terminal device. As illustrated in FIG. 7, the user sends a speech instruction to the intelligent speech interactive device with the screen, after the intelligent speech interactive device with the screen receives the speech instruction, the intelligent speech interactive device with the screen sends the received speech instruction to the cloud, the cloud performs speech recognition on the speech instruction by Automatic Speech Recognition (ASR) technology and Natural Language Understanding (NLU) technology, and determines the matched response according to the recognition result, and the cloud feeds back the determined response to the intelligent speech interactive device with the screen, to respond to the user by the intelligent speech interactive device with the screen. The response of the intelligent speech interactive device with the screen to the user may be an operation matching the speech instruction displayed on the screen, or may be a speech broadcast response, or may also be both displaying the corresponding content on the screen and performing a speech broadcast response. For example, in the example shown in FIG. 3(c), the user can issue a speech instruction for making a call according to the voice guidance information, and when the speech instruction issued by the user is "Xiao Du Xiao Du, call mom", the intelligent speech interactive device with the screen may make a response to make a call to the contact whose contact name is "Mom", and display the content of the screen as the dialing interface, as shown in FIG. 8. As another example, when the speech instruction issued by the user is "I want to listen to the song "Follower", the intelligent speech interactive device with the screen can switch the screen to display related information such as the singer, the album, and the lyrics of the "The Follower". Moreover, the intelligent speech interactive device with the screen may also play the song "Follower" for the user.

It should be noted that, the speech recognition processing for the speech instruction may also be performed by the terminal device, the speech recognition processing performed by the cloud is merely explained as an example in FIG. 7, and is not intended to limit the present disclosure.

By receiving the speech message of the user to perform the switching operation processing on the corresponding area in the content card, speech control of the terminal device can be realized, user's hands can be liberated, and operation convenience can be improved.

In a possible implementation of embodiments of the present disclosure, the terminal device may also set an update identifier for a content card dynamically updated, to remind the user to view the content card. For example, when the screen of the terminal device currently displays the content card of the contact, when the content displayed on the content card of the hotspot recommendation is updated, the prompt message such as "hotspot recommendation is updated, remember to view" may be displayed on the card of the contact currently displayed, to remind the user to view the updated information. Thus, the user can conveniently grasp the update information of the content card in time, thereby avoiding the user from missing information to be processed or missing content of interest.

In order to implement the above embodiments, the present disclosure further provides a device for displaying application function information.

Figure 9:
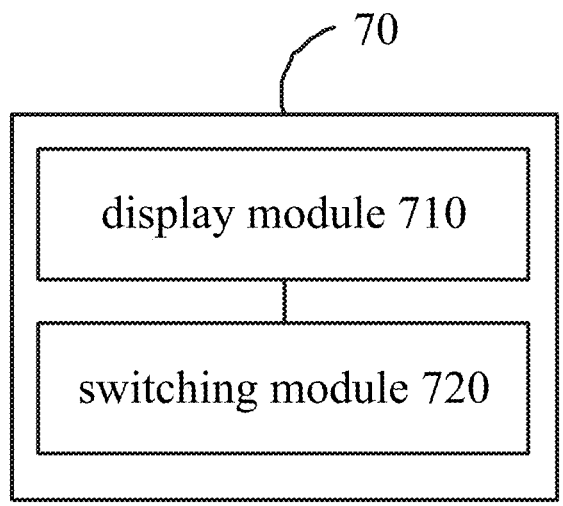
FIG. 9 is a block diagram of a device for displaying application function information according to an embodiment of the present disclosure.

FIG. 9 is a block diagram of a device for displaying application function information according to an embodiment of the present disclosure.

As illustrated in FIG. 9, the device may include a display module 710 and a switching module 720.

The display module 710 is configured to display a content card associated with an application function on a screen of a terminal device.

In detail, the display module 710 is configured to obtain preset display parameters, and display the content card associated with the application function on the screen of the terminal device according to the display parameters. The preset display parameters include the number of cards displayed on the screen and a display size of the content card.

Furthermore, in a possible implementation of embodiments of the present disclosure, when the number of cards displayed on the screen is greater than 1, the display parameters further include a card arrangement manner. The card arrangement manner includes horizontal arrangement, or longitudinal arrangement, or mix of horizontal and longitudinal arrangements, or circular arrangement.

The switching module 720 is configured to perform a switching operation on the content card currently displayed on the screen when it is detected that a preset switching condition is satisfied.

In one embodiment, as a possible implementation, the switching module 720 is configured to receive a speech message from a user, and perform semantic recognition on the speech message, and perform the switching operation on the content card currently displayed on the screen when it is recognized that the speech message matches a preset speech switching instruction.

In another embodiment, as a possible implementation, the switching module 720 is configured to detect a trigger operation of a user on the screen, and perform the switching operation on the content card currently displayed on the screen when it is detected that the trigger operation matches a preset switching trigger operation.

In another embodiment, as a possible implementation, the switching module 720 is configured to detect a limb movement trace of a user, and perform the switching operation on the content card currently displayed on the screen when it is detected that the limb movement trace matches a preset switching trigger trace.

In another embodiment, as a possible implementation, the switching module 720 is configured to perform the switching operation on the content card currently displayed on the screen when it is detected that a preset switching time period has elapsed.

In detail, when the switching module 720 is configured to perform the switching operation on the content card currently displayed on the screen, the switching module 720 is configured to: perform horizontally to left or right switching on the content card currently displayed on the screen to display other content cards associated with the application function; or perform longitudinally to up or down switching on the content card currently displayed on the screen to display other content cards associated with the application function; or perform page flipping switching on the content card currently displayed on the screen to display other content cards associated with the application function.

Figure 10:
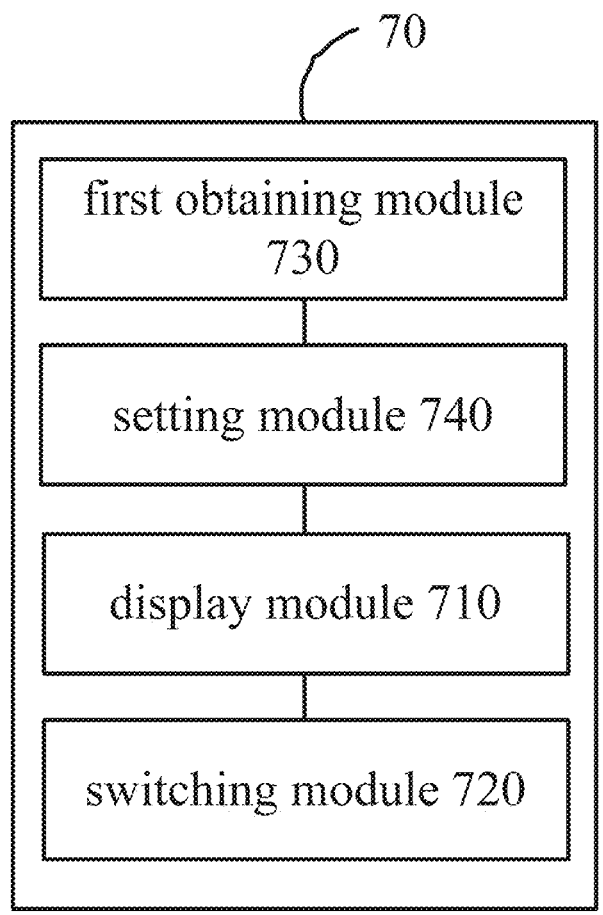
FIG. 10 is a block diagram of a device for displaying application function information according to another embodiment of the present disclosure.

In a possible implementation of embodiments of the present disclosure, as illustrated in FIG. 10, on the basis of embodiments illustrated in FIG. 9, the device 70 further includes a first obtaining module 730 and a setting module 740.

The first obtaining module 730 is configured to obtain preference characteristics of a user.

In detail, the first obtaining module 730 is configured to obtain the preference characteristics of the user based on application subscription content of the user; and/or obtain the preference characteristics of the user based on browsing operation of the user on the content card.

The setting module 740 is configured to set an application function type displayed on the screen each time and/or a display order according to the preference characteristics.

The application function type includes one or more combinations of application usage guidance, application content notification, to-do lists reminder, instant messaging, hotspot recommendation and preference characteristic recommendation.

By obtaining the preference characteristics of the user, and the application function type displayed on the screen each time and/or the display order can be set according to the preference characteristics, personalized display of the content card can be realized, such that the information displayed on the screen conforms to user's preference, flexibility and personalization can be improved, configurability of the content displayed on the screen can be improved, and user experience can be improved.

Figure 11:
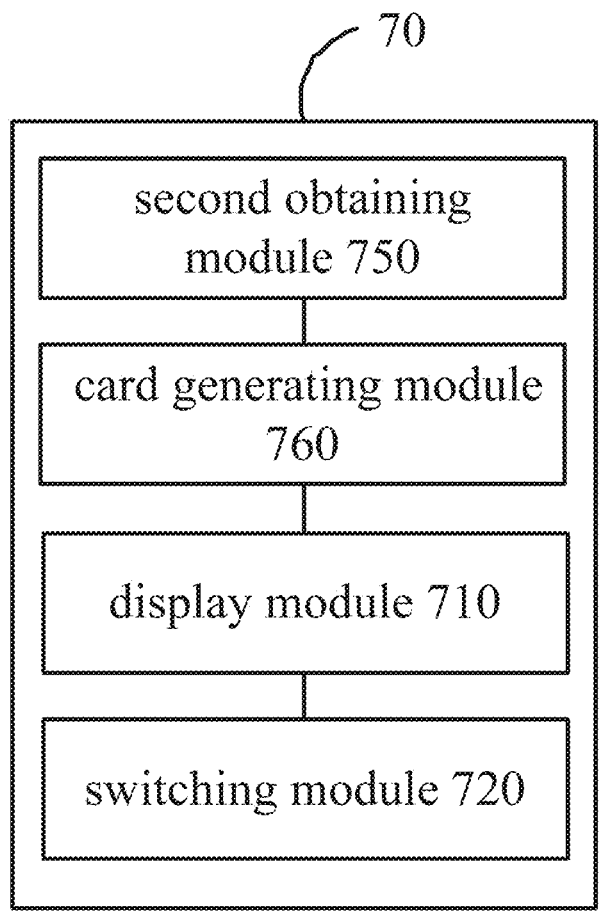
FIG. 11 is a block diagram of a device for displaying application function information according to yet another embodiment of the present disclosure.

In a possible implementation of embodiments of the present disclosure, as illustrated in FIG. 11, on the basis of embodiments illustrated in FIG. 9, the device 70 further includes a second obtaining module 750 and a card generating module 760.

The second obtaining module 750 is configured to obtain related information of the application function.

In detail, the second obtaining module 750 is configured to obtain the related information of the application function from a local application of the terminal device; and/or obtain the related information of the application function from an operating system application of the terminal device; and/or obtain the related information of the application function from a network side.

The card generating module 760 is configured to generate the content card associated with the application function according to a preset card template and the related information.

The card template includes one or more combinations of a picture area, a text area, a summary area, a voice guidance area, a detailed content entry area, an application icon area, and a content subject list area.

By obtaining the related information of the application function, and the content card associated with the application function is generated according to the preset card template and the related information, the function of the application can be displayed on the screen, it is convenient for the user to use the function of the application, and the user does not need to perform multiple operations to enter the application to obtain the desired function, user's operation steps can be simplified, and efficiency of obtaining functions can be improved.

In a possible implementation of embodiments of the present disclosure, the device 70 may receive a speech message from the user, perform semantic recognition on the speech message, and perform an operation processing on a corresponding area in the content card according to a semantic recognition result.

By receiving the speech message of the user to perform the switching operation processing on the corresponding area in the content card, speech control of the terminal device can be realized, user's hands can be liberated, and operation convenience can be improved.

In a possible implementation of embodiments of the present disclosure, the device 70 may set an update identifier for a content card dynamically updated, to remind the user to view the content card. Thus, the user can conveniently grasp the update information of the content card in time, thereby avoiding the user from missing information to be processed or missing content of interest.

It should be noted that, the explanation and description in embodiments of the method for displaying application function information are also applicable to the device for displaying application function information in this embodiment, and the implementation principle thereof is similar, and details are not described herein again.

With the device for displaying application function information according to embodiments of the present disclosure, the content card associated with the application function is displayed on the screen of the terminal device, when it is detected that the preset switching condition is satisfied, the content card currently displayed on the screen is switched. Thus, by displaying functions of the application on the screen of the terminal device, the functions of the application can be directly presented to the user, the inconvenience caused by displaying application functions in the multi-level menu manner in the related art can be avoided, such that the user can obtain the desired function without performing multiple operations, usage convenience and search efficiency can be improved, user experience can be improved, and technical problems that the user needs to perform multiple operation obtain the desired function in the related art can be solved.

In order to implement the above embodiments, the present disclosure further provides a terminal device.

Figure 12:
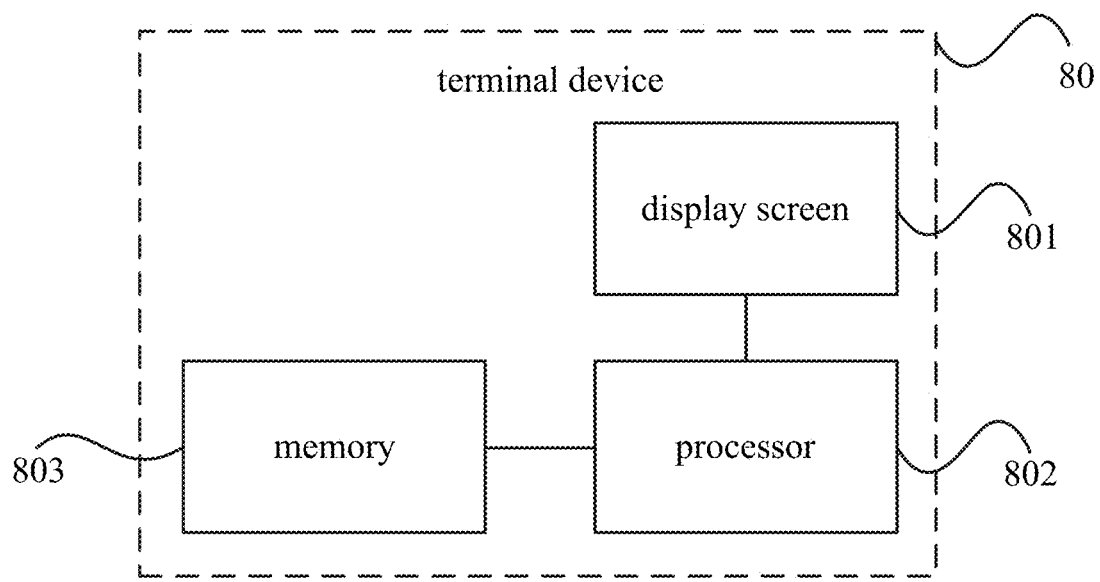
FIG. 12 is a block diagram of a terminal device according to an embodiment of the present disclosure.

FIG. 12 is a block diagram of a terminal device according to an embodiment of the present disclosure.

As illustrated in FIG. 12, the terminal device 80 includes a display screen 801, a processor 802 and a memory 803. The display screen 801 is configured to display a content card associated with an application function. The processor 802 is configured to run a program corresponding to executable program codes by reading the executable program codes stored in the memory 803, to implement the method for displaying application function information according to above embodiments of the present disclosure.

The terminal device 80 may be, for example, a device having a display screen such as a smart phone, a speaker, a refrigerator, a tablet computer, an electronic photo album, and the like.

Figure 13:
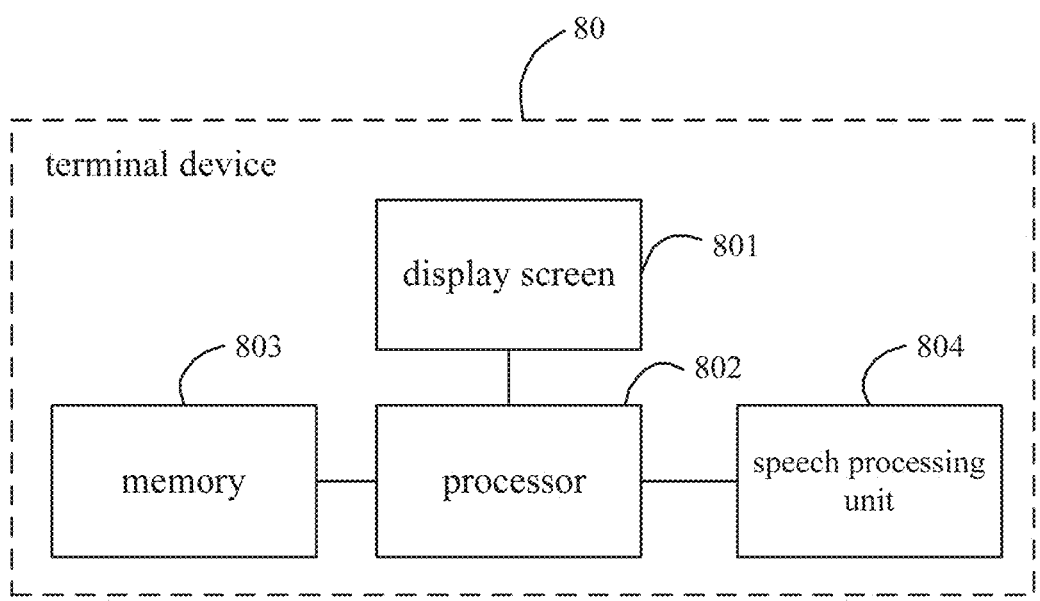
FIG. 13 is a block diagram of a terminal device according to another embodiment of the present disclosure.

Furthermore, in a possible implementation of embodiments of the present disclosure, as illustrated in FIG. 13, on the basis of embodiments illustrated in FIG. 12, the terminal device 80 further includes a speech processing unit 804.

The speech processing unit 804 is configured to perform semantic recognition on received speech message.

In the embodiment, after the microphone of the terminal device 80 receives a speech message sent by the user, the speech processing unit 804 performs semantic recognition on the received speech message, and sends the recognition result to the processor 802. The processor 802 switches the content card displayed on the display screen 801 according to the recognition result, or performs an operation processing on a corresponding area in the content card displayed on the display screen 801.

With the terminal device according to embodiments of the present disclosure, the content card associated with the application function is displayed on the screen of the terminal device, when it is detected that the preset switching condition is satisfied, the content card currently displayed on the screen is switched. Thus, by displaying functions of the application on the screen of the terminal device, the functions of the application can be directly presented to the user, the inconvenience caused by displaying application functions in the multi-level menu manner in the related art can be avoided, such that the user can obtain the desired function without performing multiple operations, usage convenience and search efficiency can be improved, user experience can be improved, and technical problems that the user needs to perform multiple operation obtain the desired function in the related art can be solved.

Figure 14:
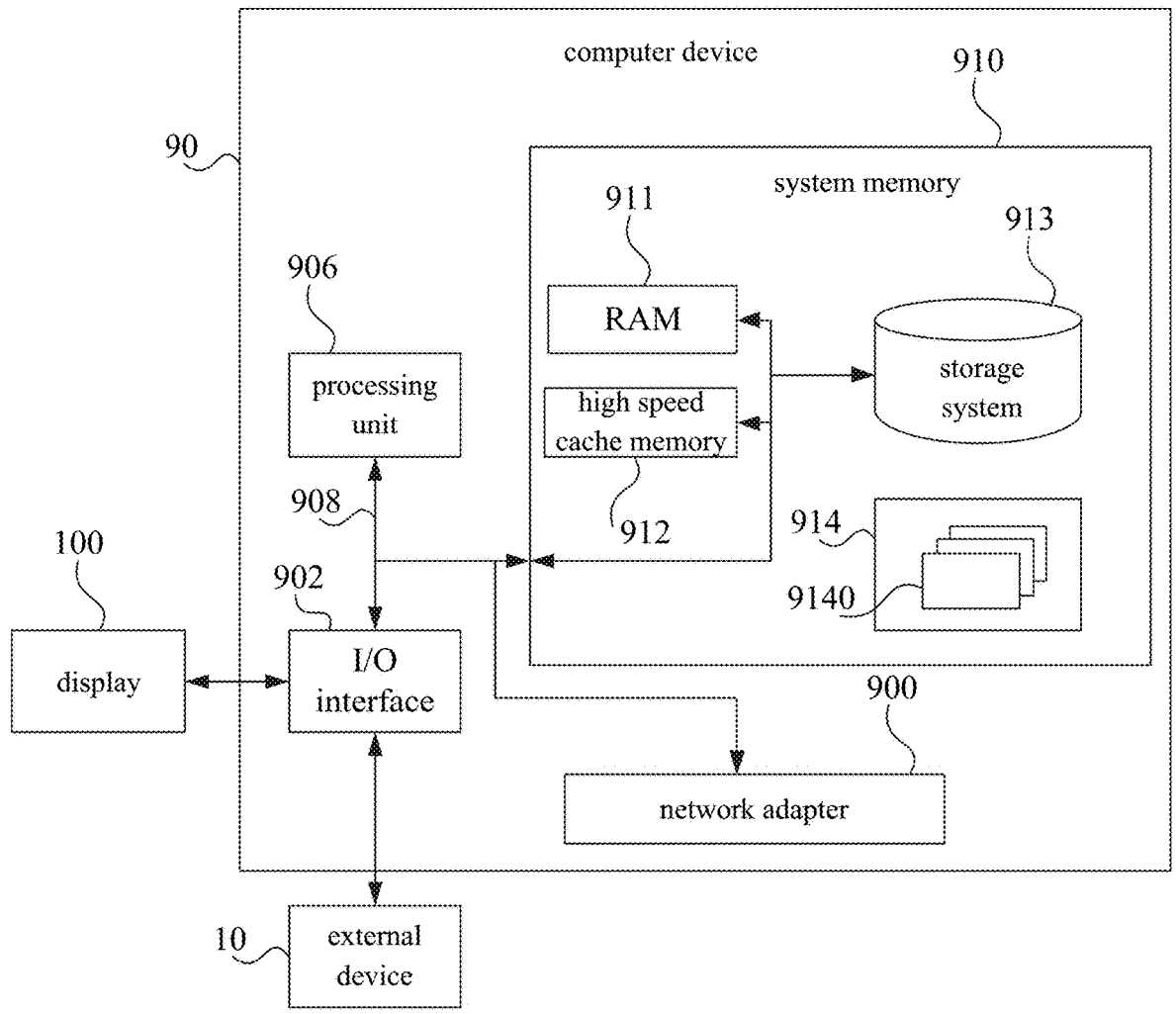
FIG. 14 is a block diagram of a terminal device according to an embodiment of the present disclosure.

FIG. 14 is a block diagram illustrating a terminal device according to an embodiment of the present disclosure. FIG. 14 illustrates a block diagram of an exemplary terminal device 90 suitable for realizing implementations of the present disclosure. The terminal device 90 illustrated in FIG. 14 is merely an example, which should be not understood to limit he functions and usage scope of embodiments of the present disclosure.

As illustrated in FIG. 14, the terminal device 90 may be represented via a general computer device form. Components of the terminal device 90 may include but be not limited to one or more processors or processing units 906, a system memory 910, and a bus 908 connecting various system components including the system memory 910 and the processing units 906.

The bus 908 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The terminal device 90 typically includes a variety of computer system readable media. These media may be any available media accessible by the terminal device 90, and include both volatile and non-volatile media, removable and non-removable media.

The system memory 910 may include a computer system readable medium in the form of volatile memory, such as a random access memory (hereinafter referred to as RAM) 911 and/or a high speed cache memory 912. The terminal device 90 may further include other removable or non-removable, volatile or non-volatile computer system storage media. By way of example only, the storage system 913 may be configured to read and write a non-removable and non-volatile magnetic media (not shown in FIG. 14, commonly referred to as a "hard drive"). Although not shown in FIG. 14, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 908 via one or more data medium interfaces. The memory 910 may include at least one program product. The program product has a set (such as, at least one) of program modules configured to perform the functions of various embodiments of the present disclosure.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

A program/utility 914 having a set (at least one) of the program modules 9140 may be stored in, for example, the memory 910. The program modules 9140 include but are not limited to, an operating system, one or more application programs, other programs modules, and program data. Each of these examples, or some combination thereof, may include an implementation of a network environment. The program modules 9140 generally perform the functions and/or methods in the embodiments described herein.

The terminal device 90 may also communicate with one or more external devices 10 (such as, a keyboard, a pointing device, a display 100, etc.). Furthermore, the terminal device 90 may also communicate with one or more communication devices enabling a user to interact with the terminal device 90 and/or other devices (such as a network card, modem, etc.) enabling the terminal device 90 to communicate with one or more terminal devices. This communication can be performed via the input/output (I/O) interface 902. Also, the terminal device 90 may communicate with one or more networks (such as a local area network (hereafter referred to as LAN), a wide area network (hereafter referred to as WAN) and/or a public network such as an Internet) through a network adapter 900. As shown in FIG. 14, the network adapter 900 communicates with other modules of the terminal device 90 over the bus 908. It should be understood that, although not shown in FIG. 14, other hardware and/or software modules may be used in connection with the terminal device 90. The hardware and/or software includes, but is not limited to, microcode, device drivers, redundant processing units, external disk drive arrays, RAID systems, tap Drive and data backup storage system.

The processing unit 906 is configured to execute various functional applications and data processing by running programs stored in the system memory 910, for example, implementing the method for displaying application function information provided in embodiments of the present disclosure.

To implement the above embodiments, embodiments of the present disclosure provide a computer program product, when instructions in the computer program product are executed by a processor, the method for displaying application function information according to embodiments of the present disclosure is implemented.

To implement the above embodiments, embodiments of the present disclosure provide a non-transitory computer-readable storage medium having computer programs stored thereon. When the programs are executed by a processor, the method for displaying application function information according to embodiments of the present disclosure is implemented.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means two or more than two, like two or three, unless specified otherwise.

It will be understood that, the flow chart or any process or method described herein in other manners may represent a module, segment, or portion of code that includes one or more executable instructions to implement the specified logic function(s) or that includes one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for displaying application function information, applied to an intelligent speech interactive speaker with a screen, comprising:
    obtaining preset display parameters, wherein the preset display parameters comprise the number of cards displayed on the screen and a display size of content cards associated with application functions of an audio/video playback application;
    displaying the content cards directly on the screen according to the display parameters, wherein the content cards comprise a basic information card, a functional card and a guidance information card displayed in a card arrangement manner, the card arrangement manner comprises a circular arrangement on the screen, personality radio, new song recommendation, and ranking information are displayed on at least one of the content cards, and the audio/video playback application is operated directly on the content cards without enabling the application; and
    performing a switching operation on the content cards currently displayed on the screen when detecting that a preset switching condition is satisfied, comprising: detecting at least one of a limb movement trace of a user and a speech of the user; and performing page flipping switching on the content cards currently displayed on the screen according to the limb movement trace or the speech, to display other content cards associated with the application functions; and
    displaying an update identifier on a region of each content card which is dynamically updated.

2. The method according to claim 1, wherein performing the switching operation on the content card currently displayed on the screen comprises:
    performing horizontally to left or right switching on the content card currently displayed on the screen, to display other content cards associated with the application function; or
    performing longitudinally to up or down switching on the content card currently displayed on the screen, to display other content cards associated with the application function.

3. The method according to claim 1, wherein performing the switching operation on the content card currently displayed on the screen when detecting that the preset switching condition is satisfied comprises at least one of:
  receiving a speech message from a user, and performing semantic recognition on the speech message; and
  performing the switching operation on the content card currently displayed on the screen when recognizing that the speech message matches a preset speech switching instruction,
  detecting a trigger operation of a user on the screen; and
  performing the switching operation on the content card currently displayed on the screen when detecting that the trigger operation matches a preset switching trigger operation,
  performing the switching operation on the content card currently displayed on the screen when detecting
  performing the switching operation on the content card currently displayed on the screen when detecting that a preset switching time period has elapsed.

4. The method according to claim 1, wherein before displaying the content card associated with the application function on the screen, the method further comprises:
  obtaining preference characteristics of a user; and
  setting an application function type displayed on the screen each time and/or a display order according to the preference characteristics, wherein the application function type comprises one or more combinations of application usage guidance, application content notification, to-do lists reminder, instant messaging, hotspot recommendation and preference characteristic recommendation;
  wherein obtaining the preference characteristics of the user comprises:
  obtaining the preference characteristics of the user based on application subscription content of the user; and/or
  obtaining the preference characteristics of the user based on browsing operation of the user on the content card.

5. The method according to claim 1, wherein before displaying the content card associated with the application function on the screen, the method further comprise:
  obtaining related information of the application function; and
  generating the content card associated with the application function according to a preset card template and the related information, wherein the card template comprises one or more combinations of a picture area, a text area, a summary area, a voice guidance area, a detailed content entry area, an application icon area, and a content subject list area.

6. The method according to claim 5, wherein obtaining the related information of the application function comprises:
  obtaining the related information of the application function from a local application of the intelligent speech interactive speaker; and/or
  obtaining the related information of the application function from an operating system application of the intelligent speech interactive speaker; and/or
  obtaining the related information of the application function from a network side.

7. The method according to claim 1, further comprising:
  receiving a speech message from the user, and performing semantic recognition on the speech message; and
  performing an operation processing on a corresponding area in the content card according to a semantic recognition result.

8. An intelligent speech interactive speaker, comprising a display screen, a processor and a memory;
  wherein the display screen is configured to display content cards associated with application functions;
  the processor is configured to run a program corresponding to executable program codes by reading the executable program codes stored in the memory, so as to:
  obtain preset display parameters, wherein the preset display parameters comprise the number of cards displayed on the screen and a display size of content cards associated with application functions of an audio/video playback application;
  display the content cards directly on the screen according to the display parameters, wherein the content cards comprise a basic information card, a functional card and a guidance information card displayed in a card arrangement manner, the card arrangement manner comprises a circular arrangement on the screen, personality radio, new song recommendation, and ranking information are displayed on at least one of the content cards, and the audio/video playback application is operated directly on the content cards without enabling the application; and
  perform a switching operation on the content cards currently displayed on the screen when detecting that a preset switching condition is satisfied, by performing acts of: detecting at least one of a limb movement trace of a user and a speech of the user; and performing page flipping switching on the content cards currently displayed on the screen according to the limb movement trace or the speech, to display other content cards associated with the application functions; and
  display an update identifier on a region of each content card which is dynamically updated.

9. The intelligent speech interactive speaker according to claim 8, wherein when the processor is configured to perform the switching operation on the content card currently displayed on the screen, the processor is configured to:
  perform horizontally to left or right switching on the content card currently displayed on the screen, to display other content cards associated with the application function; or
  perform longitudinally to up or down switching on the content card currently displayed on the screen, to display other content cards associated with the application function.

10. The intelligent speech interactive speaker according to claim 8, wherein when the processor is configured to perform the switching operation on the content card currently displayed on the screen when detecting that the preset switching condition is satisfied, the processor is configured to perform at least one of:
  receiving a speech message from a user, and performing semantic recognition on the speech message; and
  performing the switching operation on the content card currently displayed on the screen when recognizing that the speech message matches a preset speech switching instruction,
  detecting a trigger operation of a user on the screen; and
  performing the switching operation on the content card currently displayed on the screen when detecting that the trigger operation matches a preset switching trigger operation,
  performing the switching operation on the content card currently displayed on the screen when detecting that a preset switching time period has elapsed.

11. The intelligent speech interactive speaker according to claim 8, wherein the processor is further configured to:
  obtain preference characteristics of a user; and
    set an application function type displayed on the screen each time and/or a display order according to the preference characteristics, wherein the application function type comprises: one or more combinations of application usage guidance, application content notification, to-do lists reminder, instant messaging, hotspot recommendation and preference characteristic recommendation;
  wherein when the processor is configured to obtain the preference characteristics of the user, the processor is configured to:
    obtain the preference characteristics of the user based on application subscription content of the user; and/or
    obtain the preference characteristics of the user based on browsing operation of the user on the content card.

12. The intelligent speech interactive speaker according to claim 8, wherein the processor is further configured to:
  obtain related information of the application function; and
  generate the content card associated with the application function according to a preset card template and the related information, wherein the card template comprises: one or more combinations of a picture area, a text area, a summary area, a voice guidance area, a detailed content entry area, an application icon area, and a content subject list area.

13. The intelligent speech interactive speaker according to claim 12, wherein when the processor is configured to obtain the related information of the application function, the processor is configured to:
  obtain the related information of the application function from a local application of the terminal device; and/or
  obtain the related information of the application function from an operating system application of the terminal device; and/or
  obtain the related information of the application function from a network side.

14. The intelligent speech interactive speaker according to claim 8, wherein the processor is further configured to:
  receive a speech message from the user, and perform semantic recognition on the speech message; and
    perform an operation processing on a corresponding area in the content card according to a semantic recognition result;
    set an update identifier for a content card dynamically updated, to remind the user to view the content card.

15. A computer program product, wherein when instructions stored in the computer program product are executed by a processor, a method for displaying application function information is implemented, the method is applied to an intelligent speech interactive speaker with a screen, and comprises:
  obtaining preset display parameters, wherein the preset display parameters comprise the number of cards displayed on the screen and a display size of content cards associated with application functions of an audio/video playback application;
  displaying the content cards directly on the screen according to the display parameters, wherein the content cards comprise a basic information card, a functional card and a guidance information card displayed in a card arrangement manner, the card arrangement manner comprises a circular arrangement on the screen, personality radio, new song recommendation, and ranking information are displayed on at least one of the content cards, and the audio/video playback application is operated directly on the content cards without enabling the application; and
  performing a switching operation on the content cards currently displayed on the screen when detecting that a preset switching condition is satisfied, comprising: detecting at least one of a limb movement trace of a user and a speech of the user; and performing page flipping switching on the content cards currently displayed on the screen according to the limb movement trace or the speech, to display other content cards associated with the application functions; and
  displaying an update identifier on a region of each content card which is dynamically updated.

16. The method according to claim 1, wherein the card arrangement manner comprises: horizontal arrangement from left to right on the screen, longitudinal arrangement from top to bottom on the screen, and mix of horizontal and longitudinal arrangements.

* * * * *